United States Patent
Beaver

(10) Patent No.: US 8,446,709 B2
(45) Date of Patent: May 21, 2013

(54) ELECTRICAL SYSTEM AND AUTOMATIC IDENTIFICATION SYSTEM THEREFOR

(75) Inventor: Jon Christopher Beaver, Greenwood, SC (US)

(73) Assignee: Eaton Corporation, Cleveland, OH (US)

( * ) Notice: Subject to any disclaimer, the term of this patent is extended or adjusted under 35 U.S.C. 154(b) by 357 days.

(21) Appl. No.: 13/028,382

(22) Filed: Feb. 16, 2011

(65) Prior Publication Data

US 2012/0206861 A1    Aug. 16, 2012

(51) Int. Cl.
*H02B 11/127*    (2006.01)
*H01H 9/20*    (2006.01)

(52) U.S. Cl.
USPC ............... 361/606; 200/50.21; 200/50.24; 361/608; 361/614; 361/724

(58) Field of Classification Search
None
See application file for complete search history.

(56) References Cited

U.S. PATENT DOCUMENTS

| | | |
|---|---|---|
| 3,947,728 A | 3/1976 | Smith |
| 4,017,698 A | 4/1977 | Kuhn et al. |
| 4,761,521 A | 8/1988 | Beck et al. |
| 5,278,722 A | 1/1994 | Peruso |
| 5,453,587 A | 9/1995 | Hurley et al. |
| 5,477,017 A | 12/1995 | Swindler et al. |
| 5,822,165 A | 10/1998 | Moran |
| 6,205,017 B1 | 3/2001 | Wilkie, II et al. |
| 6,504,693 B1 | 1/2003 | Moffat et al. |
| 6,628,513 B1 * | 9/2003 | Gallagher et al. ....... 361/679.33 |
| 6,777,627 B1 | 8/2004 | Stevenson |
| 6,897,388 B2 | 5/2005 | Greer |
| 7,019,230 B1 * | 3/2006 | Vaill et al. ............... 200/50.24 |
| 7,551,456 B2 * | 6/2009 | Behrens et al. ............. 361/788 |
| 8,179,696 B2 * | 5/2012 | Coomer et al. ............. 361/819 |
| 2003/0048613 A1 * | 3/2003 | Garnett et al. ............. 361/724 |
| 2005/0117309 A1 * | 6/2005 | Rieken et al. ............. 361/724 |
| 2009/0014291 A1 | 1/2009 | Stevenson |
| 2009/0301851 A1 | 12/2009 | Morris et al. |

* cited by examiner

*Primary Examiner* — Gregory Thompson
(74) *Attorney, Agent, or Firm* — Eckert Seamans Cherin & Mellott, LLC; Grant E. Coffield

(57) ABSTRACT

An identification system is provided for an electrical system. The electrical system includes a switchgear enclosure, a number of electrical switching apparatus, and a racking mechanism movably coupling the electrical switching apparatus to the enclosure. The identification system includes a control mechanism having a controller and a plurality of software programs. The controller includes a number of inputs from a corresponding one of the electrical switching apparatus, and a number of outputs to the racking mechanism. Each software program provides functionality to the outputs to control racking movement of a predetermined type of electrical switching apparatus. Responsive to the inputs from the electrical switching apparatus, the controller identifies the predetermined type of electrical switching apparatus, and then automatically selects a corresponding one of the software programs to control movement of the electrical switching apparatus. Thus, the same controller is operational with different predetermined types of electrical switching apparatus.

20 Claims, 3 Drawing Sheets

ELECTRICAL SYSTEM AND AUTOMATIC IDENTIFICATION SYSTEM THEREFOR

BACKGROUND

1. Field

The disclosed concept relates generally to electrical systems and, more particularly, to electrical systems employing electrical switching apparatus, such as circuit breakers. The disclosed concept also relates to automatic identification systems for electrical systems.

2. Background Information

Circuit breakers for medium-voltage and high-voltage switchgear apparatus applications are generally housed in metal enclosures and are removable. The apparatus typically includes at least one racking or levering-in mechanism or device to move a circuit breaker between a disconnect position, in which the primary contacts of the circuit breaker are fully disengaged from the mating primary contacts within the enclosure, and a connect position, in which the primary contacts of the circuit breaker and enclosure are fully engaged. Racking, or levering-in and levering-out/withdrawing of a circuit breaker can be accomplished automatically or by using a detachable hand crank, which is inserted into the levering-in mechanism to move the circuit breaker within its cell as a function of turning the crank.

Typically, power is provided to auxiliary devices and control circuitry through mating secondary contacts mounted with the circuit breaker in the enclosure. At some point during movement of the circuit breaker from the disconnect position to the connect position, the respective secondary contacts must be engaged in order that power is provided to the auxiliary devices and the control circuitry. When the secondary contacts are engaged, but the primary contacts are disengaged or disconnected, the auxiliary functions of the circuit breaker can be safely tested since the circuit breaker is not energized.

Select software is typically employed in conjunction with a controller to control racking of the circuit breaker in and out of the switchgear enclosure. Traditionally, the software has had to be manually selected by the user, which is time-consuming, requires access to reference information, and is susceptible to user error (e.g., without limitation, selecting the wrong software or wrong type of electrical switching apparatus or switchgear), which could lead to safety and quality control problems. Prior proposals for properly identifying switchgear in an attempt to address these issues have included bar coding and the use of different controllers having keyed plugs or connectors. Bar coding, however, requires substantial time and, again, allows for the possibility of user error (e.g., without limitation, forgetting to scan the barcode of a circuit breaker that is being newly implemented, such that the software being used is for the previous type of switchgear that had been used previously). Using different controllers with keyed plugs or connectors undesirably requires the user to inventory and keep track of multiple different controllers, which increases costs and can cause confusion.

There is, therefore, room for improvement in electrical systems and in automatic identification systems therefor.

SUMMARY

These needs and others are met by embodiments of the disclosed concept, which are directed to an automatic identification system. Among other benefits, a single controller can be used to accurately identify a wide variety of different electrical switching apparatus and automatically select appropriate software for controlling racking movement of the electrical switching apparatus with respect to the switchgear enclosure.

As one aspect of the disclosed concept, an identification system is provided for an electrical system. The electrical system comprises a switchgear enclosure, a number of electrical switching apparatus, and a racking mechanism structured to movably couple the electrical switching apparatus to the enclosure. The identification system comprises: a control mechanism comprising a controller and a plurality of software programs, the controller comprising a number of inputs from a corresponding one of the electrical switching apparatus and a number of outputs to the racking mechanism, each of the software programs being structured to provide functionality to the outputs to control racking movement of a predetermined type of the electrical switching apparatus. Responsive to the inputs from the electrical switching apparatus, the controller is structured to identify the predetermined type of the electrical switching apparatus, and responsive to identifying the predetermined type of the electrical switching apparatus, the controller is structured to automatically select a corresponding one of the software programs to control movement of the electrical switching apparatus.

The number of electrical switching apparatus may be a plurality of different predetermined types of electrical switching apparatus, wherein the same controller is operational with all of the predetermined types of electrical switching apparatus. Each of the predetermined types of electrical switching apparatus may have an electrical conductor assembly, and the controller may further comprise a plurality of input terminals, wherein the electrical conductor assembly is structured to be electrically connected to a corresponding number of the input terminals of controller, thereby providing the input signals to the controller.

The control mechanism may further comprise a motor and a gear assembly, wherein the corresponding one of the software programs is structured to control the motor. The gear assembly may comprise a number of gears and an output shaft driven by the gears, wherein the motor is structured to move the gear assembly, thereby moving the gears, the output shaft and the racking mechanism to move the electrical switching apparatus. Each of the software programs may control a plurality of parameters. The parameters may comprise at least one of: (a) a number of turns of the output shaft, (b) a torque required to move the racking mechanism and the electrical switching apparatus, and (c) a distance the racking mechanism and the electrical switching apparatus move.

An electrical system comprising a switchgear enclosure, a number of electrical switching apparatus, a racking mechanism movably coupling a corresponding one of the electrical switching apparatus to the enclosure, and the aforementioned identification system, is also disclosed.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
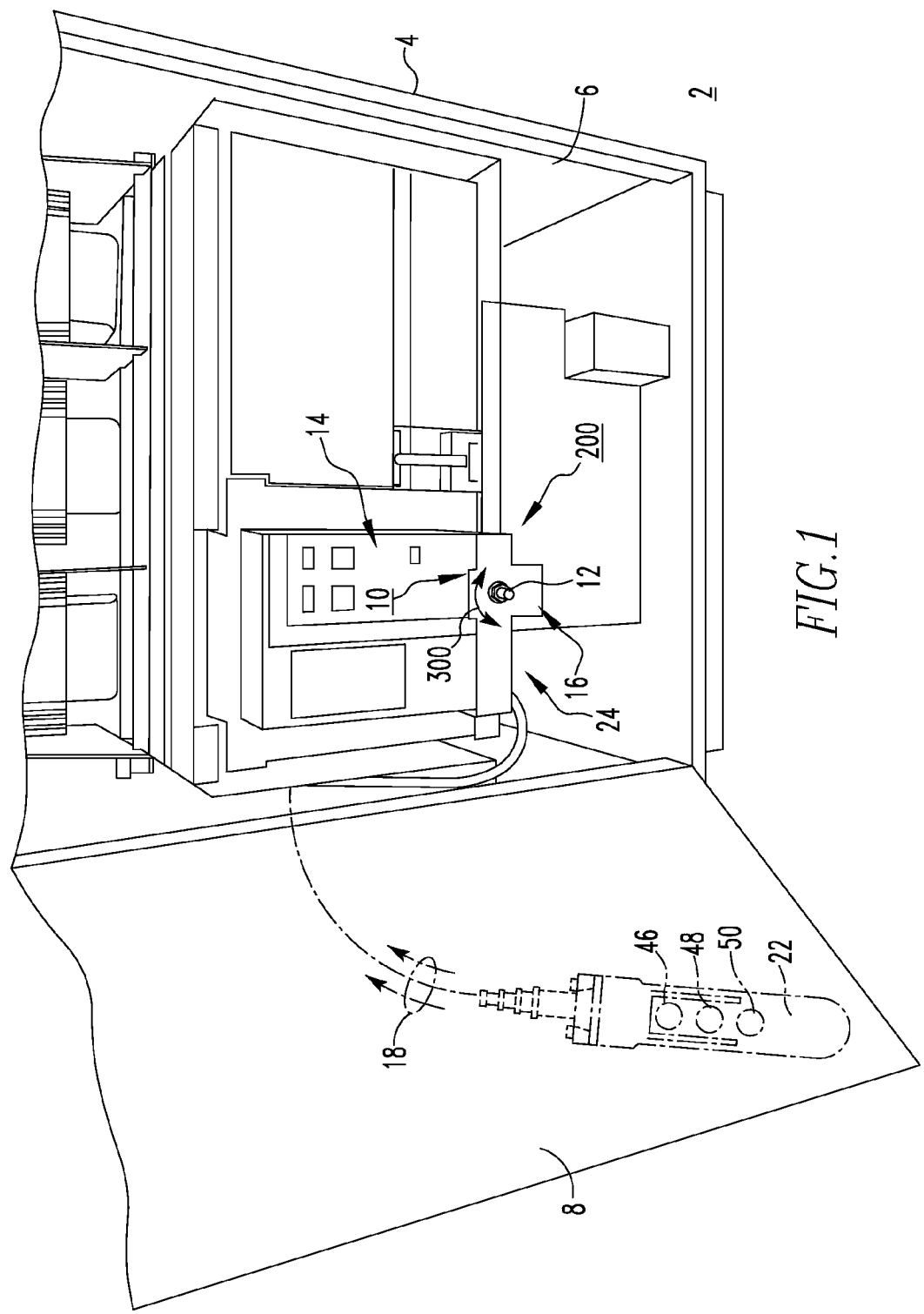
FIG. 1 is an isometric view of an electrical system and automatic identification system therefor in accordance with an embodiment of the disclosed concept.

The disclosed concept is described in association with circuit breakers, although some embodiments of the disclosed concept are applicable to a wide range of draw-out electrical switching apparatus, such as network protectors.

Directional phrases used herein, such as, for example, left, right, clockwise, counterclockwise, front, back, top, bottom and derivatives thereof, relate to the orientation of the elements shown in the drawings and are not limiting upon the claims unless expressly recited therein.

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the statement that two or more parts are "coupled" together shall mean that the parts are joined together either directly or joined through one or more intermediate parts.

As employed herein, the term "number" shall mean one or an integer greater than one (i.e., a plurality).

Referring to FIG. 1, an electrical system 2 includes an switchgear enclosure 4 having an interior 6 and a door 8 structured to open to expose the interior 6 and to close (not shown) to enclose the interior 6. A racking mechanism, generally indicated by reference 10, is disposed in the interior 6 of the enclosure 4. The racking mechanism 10 includes a member 12 (e.g., without limitation, a rotatable lead screw; a worm gear) movable (e.g., in the clockwise and counterclockwise directions of arrow 300 from the perspective of FIG. 1) between a number of positions. An electrical switching apparatus, such as for example and without limitation, a circuit breaker 14 is carried by the racking mechanism 10 and is movable thereby, for example, between a CONNECT position in the interior 6 of the switchgear enclosure 4, corresponding to a first one of the positions of the racking mechanism member 12, and a TEST position in the interior 6 of the enclosure 4, corresponding to a second different one of the positions of the racking mechanism member 12. A control mechanism 16 is structured to move the racking mechanism member 12 between the various positions responsive to a number of commands 18.

EXAMPLE 1

For example, the control mechanism 16 can be a remote control mechanism 16 structured to rotate the lead screw 12 between the first position and the different second position thereof responsive to the number of remote commands 18.

EXAMPLE 2

The remote control mechanism 16 can include a controller 20 (FIGS. 2 and 3), such as a processor, and a user interface 22 (shown in phantom line drawing in FIG. 1) cooperating with the controller 20 to provide the number of remote commands 18. The controller 20 can be structured to cooperate with the remote user interface 22, which provides the number of remote commands 18. Alternatively, the controller 20 can be activated via a switch from any suitable user interface, such as, for example, a pendant station 22' (shown in simplified form in FIG. 3), or by any suitable communications.

EXAMPLE 3

Figure 2:
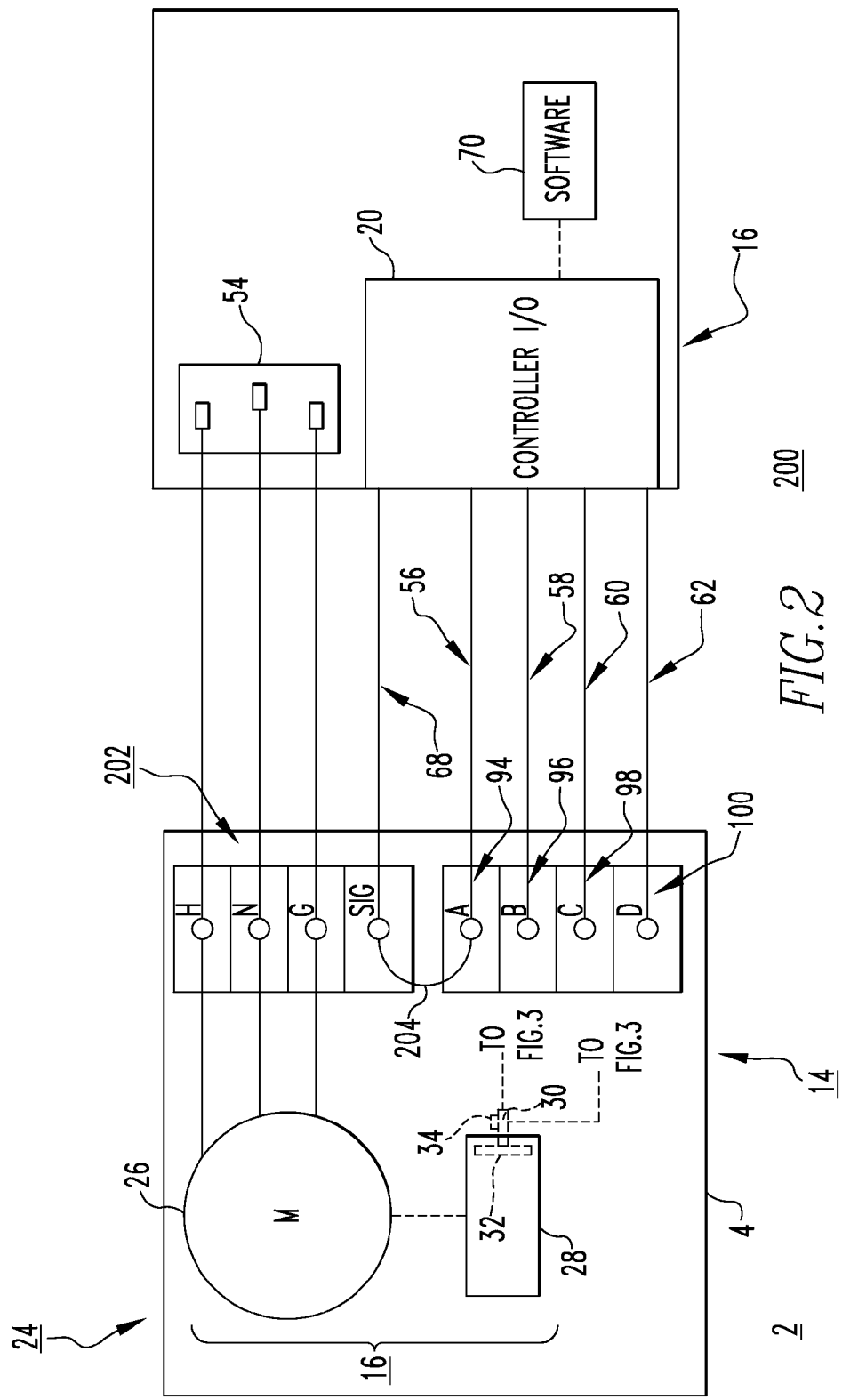
FIG. 2 is a simplified view of the electrical system and automatic identification system therefor of FIG. 1.

The control mechanism 16 can be an automatic racking system 24 including a motor 26 (FIG. 2). In one non-limiting embodiment, the automatic racking system 24 includes a gear assembly 28 (FIG. 2) and an output shaft 30 (FIG. 2) driven by the gear assembly 28. At least one gear 32 and/or the output shaft 30 of the gear assembly 28 includes a number of magnets 34 (one magnet 34 is shown in the example of FIG. 2). A sensor 36 (FIG. 3) is responsive to movement of the magnet (s) 34. The controller 20 includes an input 38 (FIG. 3) from the sensor 36, and an output 40 (FIG. 3) to power the motor 26. Accordingly, in one non-limiting embodiment of the disclosed concept, the controller 20 is structured to determine the position of the gear 32 or shaft 30 from the sensor 36, and to control the motor 26 responsive to the number of remote commands 18 (FIG. 1).

EXAMPLE 4

The controller 20 verifies the position of the circuit breaker 14 by counting revolutions of the example gear 32 in the gear assembly 28. More specifically, the controller 20 employs, for example and without limitation, a suitable magneto-resistive sensor 36 (e.g., without limitation, a 2SS52M Series digital magneto-resistive sensor marketed by Honeywell Inc. of Freeport, Ill.) to update the count.

EXAMPLE 5

The controller 20 can be a microcontroller-based device which controls the motor 26 and, thus, the gear assembly 28 that drives the lead screw 12. The circuit breaker 14 is mechanically linked to the lead screw 12 in order that when the lead screw 12 turns, the circuit breaker 14 moves in a linear fashion. That is, if the lead screw 12 is turned clockwise or counterclockwise (e.g., in the direction of arrow 300 from the perspective of FIG. 1), then the circuit breaker 14 will correspondingly move toward the CONNECT (e.g., fully engaged) position or TEST position, respectively. By controlling the direction of the motor 26, the circuit breaker 14 can be moved between the CONNECT position and the TEST position. By measuring (or counting) the number of lead screw shaft revolutions, the circuit breaker position along the lead screw 12 can be accurately determined. For example, an operator can employ the user interface 22 (FIG. 1) (see also pendant 22' of FIG. 3) that has buttons (e.g., CONNECT button 46, TEST button 48, and DISCONNECT button 50) to control the positioning of the circuit breaker 14. It will, however, be appreciated that the user could alternatively manually position the circuit breaker 14, for example, by releasing the motor 26 from the gear assembly 28, and then using a known or suitable tool (not shown) to turn the member 12 and draw-in or draw-out the circuit breaker 44.

EXAMPLE 6

The circuit breaker 14 preferably has the following example positions: (1) CONNECT in which the enclosure door 8 (FIG. 1) remains closed while the circuit breaker 14 physically engages the stabs (not shown) of potentially energized bus work (not shown) from a transformer (not shown); (2) TEST in which the enclosure door 8 remains closed and the circuit breaker 14 has moved a suitable distance (e.g., without limitation, about 1.5 inches) away from the energized bus work, but with the electrical secondary control wiring (not shown) from the circuit breaker 14 to the relay control panel (not shown) still being connected; (3) DISCONNECT (not shown) in which the circuit breaker 14 is further withdrawn and the electrical secondary control wiring is disconnected; and (4) WITHDRAWN (not shown) in which the circuit breaker 14 is physically extended to the furthest point on the rails (not shown) for removal from the corresponding enclosure 4. In the latter position, the enclosure door 8 must be opened to expose the circuit breaker 14.

EXAMPLE 7

The inputs to the controller 20 may include, for example and without limitation: (1) a magnetic field 38 for the magneto-resistive sensor 36; (2) the CONNECT button 46 (e.g., without limitation, a dry-contact input); (3) the TEST button 48 (e.g., without limitation, a dry-contact input); (4) the DISCONNECT button 50 (e.g., without limitation, a dry-contact input); (5) a limit switch 52, which is closed when the circuit breaker is DISCONNECTED; (6) a suitable line voltage 54 (e.g., without limitation, 120 VAC, 50/60 Hz, which is used to power the controller 20 and to generate the DC voltage used to drive the motor 26); and (7) a plurality of return signals 56,58,60,62,64,66 (all shown in FIG. 3) each being transmitted from a different predetermined electrical switching apparatus or switchgear type (e.g., without limitation, circuit breaker 14 of FIG. 1) to the controller 20 to identify the electrical switching apparatus and automatically select the proper software program 70 to control racking motion thereof, as will described in greater detail hereinbelow.

The outputs from the controller 20 may include, for example and without limitation: (1) a DC voltage 40 to the motor 26 (e.g., without limitation, two conductors provide 120 VDC); (2) two dry-contact terminals (e.g., without limitation, rated at 250 VAC @ 4 A that close when the CONNECT position is reached; closing of these contacts corresponds to the illumination of the "CONNECTED" indicator LED 72); (3) two dry-contact terminals (e.g., without limitation, rated at 250 VAC @ 4 A that close when the TEST position is reached; closing of these contacts corresponds to the illumination of the "TEST" indicator LED 76); (4) two dry-contact terminals (e.g., without limitation, rated at 250 VAC @ 4 A that are closed when the circuit breaker 14 is between the CONNECT and TEST positions; closing of these contacts corresponds to the illumination of the "INTERMEDIATE" indicator LED 78); and (5) an output signal 68 (FIG. 3) (e.g., without limitation, fiber-optic; current; voltage) from the controller 20 to the electrical switching apparatus or switchgear (e.g., without limitation, circuit breaker 14) to control racking motion thereof.

Accordingly, four LED indicators (referenced generally in FIG. 3) on the controller 20 include: (1) a CONNECTED LED 72, indicating the circuit breaker 14 is at the CONNECTED position (e.g., without limitation, RED); (2) a DISCONNECTED LED 74, indicating the circuit breaker 14 is DISCONNECTED (e.g., without limitation, GREEN); (3) a TEST LED 76, indicating the circuit breaker 14 at the TEST position (e.g., without limitation, YELLOW); and (4) an INTERMEDIATE LED 78, indicating that the circuit breaker 14 is at an INTERMEDIATE position (e.g., without limitation, ORANGE).

Figure 3:
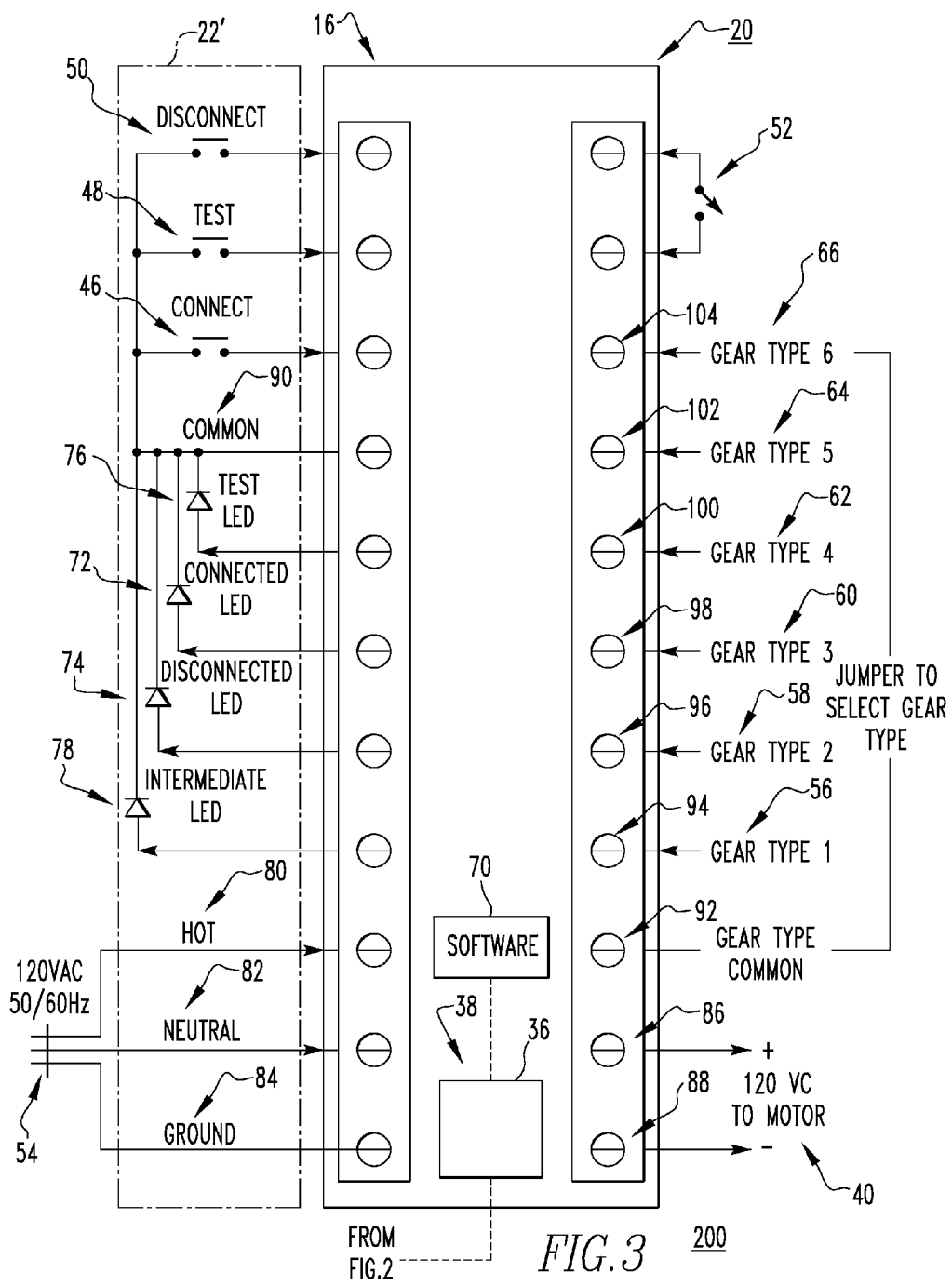
FIG. 3 is a simplified view of the controller and pendant for the electrical system and automatic identification system therefor of FIG. 2.

In the example of FIG. 3, connections to the controller 20 include, for example and without limitation: (1) AC line in hot (black) 80; (2) AC line in neutral (white) 82; (3) ground 84; (4) motor "+" terminal 86; (5) motor "−" terminal 88; (6) user interface common 90; (7) CONNECT button 46; (8) TEST button 48; (9) DISCONNECT button 50; (10) dry contacts (2 inputs) for "Test" function; (11) dry contacts (2 inputs) for "Connected" function; (12) dry contacts (2 inputs) for "Disconnected" function; (13) dry contacts (2 inputs) for "Intermediate" function; (14) limit switch 52; (15) gear type common 92; (16) gear type 1 terminal 94; (17) gear type 2 terminal 96; (18) gear type 3 terminal 98; (19) gear type 4 terminal 100; (20) gear type 5 terminal 102; (21) gear type 6 terminal 104; and (22) jumper 204 (FIG. 2) (discussed hereinbelow).

EXAMPLE 8

The electrical system 2 is provided with an identification system 200 for automatically identifying and controlling racking movement of a wide variety of predetermined electrical switching apparatus types (e.g., without limitation, circuit breaker 14). As best shown in FIG. 2, the controller 20 of the identification system 200 includes a plurality of software programs 70. In operation, inputs (e.g., without limitation, 56,58,60,62 are provided to the controller 20 from a corresponding one of the predetermined electrical switching apparatus (e.g., circuit breaker 14) and a number of outputs (see, for example, output signal 68 of FIG. 2) are sent to the racking mechanism 24. Each of the software programs 70 is structured to provide functionality to such outputs (e.g., 68) to control racking movement of the predetermined electrical switching apparatus 14, once it has been properly identified. More specifically, responsive to the inputs 56,58,60,62 from the circuit breaker 14, the controller 20 identifies the particular predetermined type of circuit breaker 14, for example and without limitation, by the brand or manufacture of the circuit breaker or by one or more operating characteristics, as will be described in greater detail hereinbelow. Responsive to identifying the predetermined type of circuit breaker 14, or other suitable electrical switching apparatus (not shown), the controller 20 automatically selects the corresponding software program 70 to appropriately control movement of the properly identified circuit breaker 14, with respect to the switchgear enclosure 4.

Accordingly, it will be appreciated that the disclosed concept advantageously allows for the same controller 20 to be operational with a wide variety of different predetermined types of electrical switching apparatus such that it is not necessary to provide a plurality of different controllers.

EXAMPLE 9

Each of the predetermined types of electrical switching apparatus (e.g., without limitation, circuit breaker 14), in accordance with the disclosed identification system 200, preferably includes a particular electrical conductor assembly 202 (shown in simplified form in FIG. 2). The controller 20 further includes a plurality of input terminals 94,96,98,100, 102,104 (all shown in FIG. 3; for input terminals 94,96,98, 100 are shown in the example of FIG. 2). The electrical conductor assembly 202 of the circuit breaker 14 is structured to be electrically connected to a corresponding number of the input terminals (e.g., without limitation, input terminals 94,96,98,100) of the controller 20, thereby providing the aforementioned input signals 56,58,60,62 from the circuit breaker 14 to the controller 20, as previously discussed.

EXAMPLE 10

The identification system 200 further includes a jumper 204 (FIG. 2), which is structured to electrically connect the predetermined electrical switching apparatus 14 to a corresponding one of the input terminals 94,96,98,100 of the controller 20. By way of example with reference to FIG. 2, the jumper 204 electrically connects the circuit breaker 14 to input terminal 94 of controller 20 to provide input signal 56 for purposes of properly identifying the circuit breaker 14 and automatically selecting the appropriate software 70 for controlling operation thereof.

When the electrical switching apparatus (e.g., without limitation, circuit breaker 14) is replaced with a different predetermined type of electrical switching apparatus (not shown), the jumper 204 is structured to be electrically connected to a different corresponding one of the input terminals of the controller 20. For example and without limitation, if a different predetermined electrical switching apparatus of "gear type 2" or "B" was implemented instead of the aforementioned circuit breaker 14 (i.e., "year type 1" or "A"), the jumper 204 would move to input terminal 96 in order to appropriately identify the new switchgear, send the appropriate input signal 58 and automatically select the proper software 70 to control the new switchgear (not shown).

EXAMPLE 11

Each of the software programs 70 controls a plurality of electrical switching apparatus racking parameters. For example and without limitation, such parameters can include at least one of: (a) a number of turns of the output shaft 30 (FIG. 2) of the gear assembly 28; (b) the amount of torque required to move the racking mechanism 24 and circuit breaker 14, or other known or suitable predetermined type of electrical switching apparatus (not shown); and (c) the distance the racking mechanism 24 and circuit breaker 14 have moved.

It will, however, be appreciated that the software 70 may accommodate any known or suitable additional or alternative number and/or type of parameters. It will further be appreciated that the identification system 200 can be readily employed with any known or suitable alternative number, type and/or configuration of circuit breakers or electrical switching apparatus other than those shown and described herein.

Accordingly, the disclosed identification system 200 provides a mechanism for efficiently and accurately identifying and controlling a wide variety of different electrical switching apparatus (e.g., without limitation, circuit breaker 14) within an electrical system 2, using the same controller 20.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An identification system for an electrical system, said electrical system comprising a switchgear enclosure, a number of electrical switching apparatus, and a racking mechanism structured to movably couple said electrical switching apparatus to said enclosure, said identification system comprising:

a control mechanism comprising a controller and a plurality of software programs, said controller comprising a number of inputs from a corresponding one of said electrical switching apparatus and a number of outputs to said racking mechanism, each of said software programs being structured to provide functionality to said outputs to control racking movement of a predetermined type of said electrical switching apparatus, wherein responsive to said inputs from said electrical switching apparatus, said controller being structured to identify the predetermined type of said electrical switching apparatus, and wherein responsive to identifying the predetermined type of said electrical switching apparatus, said controller is structured to automatically select a corresponding one of said software programs to control movement of said electrical switching apparatus.

2. The identification system of claim 1 wherein said number of electrical switching apparatus is a plurality of different predetermined types of electrical switching apparatus; and wherein the same controller is operational with all of said predetermined types of electrical switching apparatus.

3. The identification system of claim 2 wherein each of said predetermined types of electrical switching apparatus has an electrical conductor assembly; wherein said controller further comprises a plurality of input terminals; and wherein said electrical conductor assembly is structured to be electrically connected to a corresponding number of said input terminals of controller, thereby providing input signals to said controller.

4. The identification system of claim 3 wherein said electrical conductor assembly includes a jumper; wherein said jumper is structured to electrically connect said electrical switching apparatus to a corresponding one of said input terminals; and wherein, when said electrical switching apparatus is replaced with a different predetermined type of electrical switching apparatus, said jumper is structured to be electrically connected to a different corresponding one of said input terminals.

5. The identification system of claim 1 wherein said control mechanism further comprises a motor and a gear assembly; and wherein said corresponding one of said software programs is structured to control said motor.

6. The identification system of claim 5 wherein said gear assembly comprises a number of gears and an output shaft driven by said gears; and wherein said motor is structured to move said gear assembly, thereby moving said gears, said output shaft and said racking mechanism to move said electrical switching apparatus.

7. The identification system of claim 6 wherein said gear assembly further comprises a number of magnets; wherein said magnets move with said output shaft;

wherein said controller further comprises a magnetic sensor; and wherein said magnetic sensor senses movement of said magnets.

8. The identification system of claim 6 wherein each of said software programs controls a plurality of parameters; and wherein said parameters comprise at least one of: (a) a number of turns of said output shaft, (b) a torque required to move said racking mechanism and said electrical switching apparatus, and (c) a distance said racking mechanism and said electrical switching apparatus move.

9. The identification system of claim 1 wherein said control mechanism further comprises a remote user interface structured to provide a number of remote commands to said controller; and wherein responsive to said remote commands, said controller is structured to move said racking mechanism and said electrical switching apparatus.

10. An electrical system comprising:
a switchgear enclosure;
a number of electrical switching apparatus;

a racking mechanism movably coupling a corresponding one of said electrical switching apparatus to said enclosure; and an identification system comprising:

a control mechanism comprising a controller and a plurality of software programs, said controller comprising a number of inputs from a corresponding one of said electrical switching apparatus and a number of outputs to said racking mechanism, each of said software programs providing functionality to said outputs to control racking movement of a predetermined type of said electrical switching apparatus, wherein responsive to said inputs from said electrical switching apparatus, said controller identifies the predetermined type of said electrical switching apparatus, and wherein responsive to identifying the predetermined type of said electrical switching apparatus, said controller automatically selects a corresponding one of said software programs to control movement of said electrical switching apparatus.

11. The electrical system of claim 10 wherein said number of electrical switching apparatus is a plurality of different predetermined types of electrical switching apparatus; and wherein the same controller is operational with all of said predetermined types of electrical switching apparatus.

12. The electrical system of claim 11 wherein each of said predetermined types of electrical switching apparatus has an electrical conductor assembly; wherein said controller further comprises a plurality of input terminals; and wherein said electrical conductor assembly is electrically connected to a corresponding number of said input terminals of controller, thereby providing input signals to said controller.

13. The electrical system of claim 12 wherein said electrical conductor assembly includes a jumper; wherein said jumper electrically connects said electrical switching apparatus to a corresponding one of said input terminals; and wherein, when said electrical switching apparatus is replaced with a different predetermined type of electrical switching apparatus, said jumper is electrically connected to a different corresponding one of said input terminals.

14. The electrical system of claim 10 wherein said control mechanism further comprises a motor and a gear assembly; and wherein said corresponding one of said software programs controls said motor.

15. The electrical system of claim 14 wherein said gear assembly comprises a number of gears and an output shaft driven by said gears; and wherein said motor moves said gear assembly, thereby moving said gears, said output shaft and said racking mechanism to move said electrical switching apparatus.

16. The electrical system of claim 15 wherein said gear assembly further comprises a number of magnets; wherein said magnets move with said output shaft;

wherein said controller further comprises a magnetic sensor; and wherein said magnetic sensor senses movement of said magnets.

17. The electrical system of claim 15 wherein each of said software programs controls a plurality of parameters; and wherein said parameters comprise at least one of: (a) a number of turns of said output shaft, (b) a torque required to move said racking mechanism and said electrical switching apparatus, and (c) a distance said racking mechanism and said electrical switching apparatus move.

18. The electrical system of claim 10 wherein said control mechanism further comprises a remote user interface for providing a number of remote commands to said controller; and wherein responsive to said remote commands, said controller moves said racking mechanism and said electrical switching apparatus.

19. The electrical system of claim 10 wherein at least one of said electrical switching apparatus is a circuit breaker; wherein said enclosure includes an interior and a door structured to open to expose the interior and structured to close to enclose the interior; wherein said racking mechanism is disposed in the interior of said enclosure; and wherein said racking mechanism moves said circuit breaker among a plurality of positions with respect to said enclosure.

20. The electrical system of claim 19 wherein said positions include a TEST position, a CONNECTED position, a DISCONNECTED position, and an INTERMEDIATE position.

* * * * *